United States Patent
Chen et al.

(10) Patent No.: US 6,301,385 B1
(45) Date of Patent: *Oct. 9, 2001

(54) METHOD AND APPARATUS FOR SEGMENTING IMAGES PRIOR TO CODING

(75) Inventors: Tsuhan Chen, Middletown; Cassandra Turner Swain, Aberdeen, both of NJ (US)

(73) Assignee: AT&T Corp., New York, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/213,417

(22) Filed: Dec. 17, 1998

Related U.S. Application Data

(63) Continuation of application No. 08/798,200, filed on Feb. 10, 1997, now Pat. No. 5,960,111.

(51) Int. Cl.[7] ..................................................... G06K 9/34
(52) U.S. Cl. ............................................................ 382/173
(58) Field of Search .................................... 382/103, 107, 382/156, 157, 158, 173, 174, 236, 255, 266, 274, 282, 291, 199, 176, 180, 239, 159; 345/358; 433–435; 706/15, 20, 22; 348/26, 14, 15, 17, 169, 170, 349, 411–418, 586, 700

(56) References Cited

U.S. PATENT DOCUMENTS

| | | | |
|---|---|---|---|
| 4,783,833 | * 11/1988 | Kawabata et al. | 382/22 |
| 4,876,457 | * 10/1989 | Bose | 250/563 |
| 4,937,878 | * 6/1990 | Lo et al. | 382/1 |
| 5,103,488 | * 4/1992 | Gemello et al. | 382/22 |

(List continued on next page.)

OTHER PUBLICATIONS

Richard P. Lippman, An Itroduction to Computing with Neural Nets, IEEE ASSP Magazine, pp. 36–54, Apr. 1987.*

Lars Westberg, Hierarchical Contour–Based Segmentation of Dynamic Scenes, IEEE Transactions on Pattern Analysis and Machine Intelligence, vol. 14, No. 9, pp. 946–952, Sep. 1992.*

Cassandra Swain et al., Defocus–Based Image Segmentation, 1995 International Conference on Acoustics, Speech, and Signal Processing, IEEE, vol. 4, pp. 2403–2406, May 1995.*

(List continued on next page.)

*Primary Examiner*—Leo Boudreau
*Assistant Examiner*—Brian P. Werner
(74) *Attorney, Agent, or Firm*—Kenyon & Kenyon

(57) ABSTRACT

To segment moving foreground from background, where the moving foreground is of most interest to the viewer, this method uses three detection algorithms as the input to a neural network. The multiple cues used are focus, intensity, and motion. The neural network consists of a two-layered neural network. Focus and motion measurements are taken from high frequency data, edges; whereas, intensity measurements are taken from low frequency data, object interiors. Combined, these measurements are used to segment a complete object. Results indicate that moving foreground can be segmented from stationary foreground and moving or stationary background. The neural network segments the entire object, both interior and exterior, in this integrated approach. Results also demonstrate that combining cues allows flexibility in both type and complexity of scenes. Integration of cues improves accuracy in segmenting complex scenes containing both moving foreground and background. Good segmentation yields bit rate savings when coding the object of interest, also called the video object in MPEG4. This method combines simple measurements to increase segmentation robustness.

18 Claims, 6 Drawing Sheets

U.S. PATENT DOCUMENTS

| | | | |
|---|---|---|---|
| 5,687,251 | * 11/1997 | Erler et al. | 382/133 |
| 5,715,325 | * 2/1998 | Bang et al. | 382/118 |
| 5,727,081 | * 3/1998 | Burges et al. | 382/229 |
| 5,768,409 | * 6/1998 | Csipkes et al. | 382/151 |
| 5,864,630 | * 1/1999 | Cosatto et al. | 382/103 |
| 5,867,593 | * 2/1999 | Fukuda et al. | 382/176 |

OTHER PUBLICATIONS

C. Lettera et al., Foreground/Background Segmentation, Signal Processing: Image Communication, vol. 1, No. 2, Elsivier Science Publishers B.V., pp. 181–189, Oct. 1989.*

Ken–ichiro Miura et al., Neural Network that can Segment an Object from its Background in Moving Image, Institute of Electronics, Information and Communication Engineers (IEIC) Technical Report, vol. 94, No. 562, pp. 253–260, 1995.*

Tunley, H. Dynamic Segmentation and Optic Flow Extraction, Jul. 8–14, 1991, IEEE Proceedings of the Seattle International Joint Conference on Neural Networks, vol. i, pp. 599–604.

Tunley, H. Segmentation Moving Images, Jul. 9, 1990, IEEE Proceedings of the Paris International Conference on Neural Networks, vol. 1, p. 53.

Yamane, A. et al., Robust Extraction of Moving Objects Through Grouping Along with Optical Flow, Oct. 25–29, 1993, IEEE Proceedings of the 1993 International Joint Conference on Neural Networks, vol. 2, pp. 1267–1271.

* cited by examiner

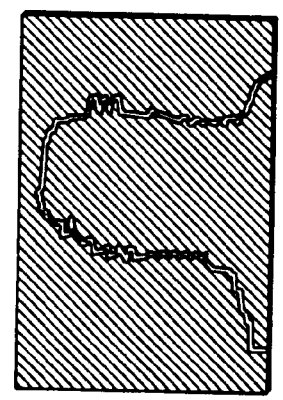
FIG. 8A (PRIOR ART)
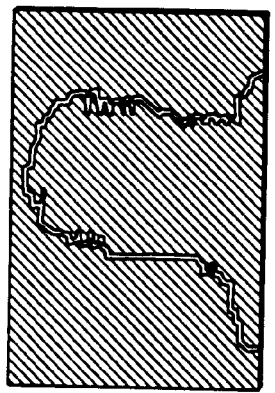
FIG. 8B (PRIOR ART)
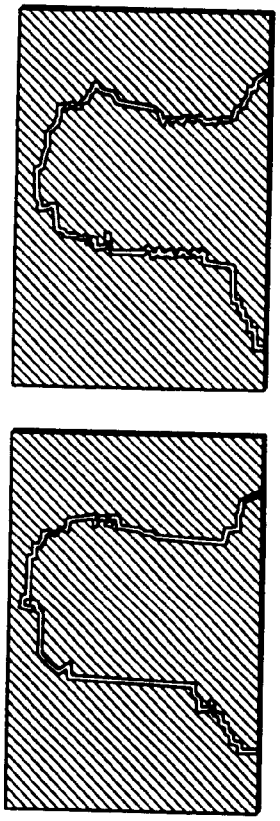
FIG. 8C (PRIOR ART)
FIG. 8D (PRIOR ART)
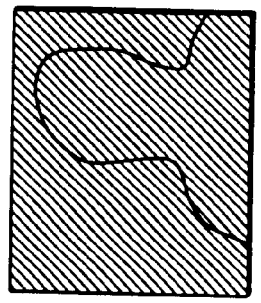
FIG. 9A (PRIOR ART)
FIG. 9B (PRIOR ART)
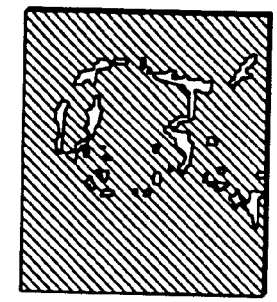
FIG. 9C (PRIOR ART)

METHOD AND APPARATUS FOR SEGMENTING IMAGES PRIOR TO CODING

This application is a continuation of application Ser. No. 08/798,200, filed on Feb. 10, 1997, issued as U.S. Pat. No. 5,960,111, and also relates to U.S. Pat. No. 5,710,829 filed by the same inventors on Apr. 25, 1995, which is hereby incorporated by reference as if repeated herein in its entirety.

BACKGROUND OF THE INVENTION

The present invention relates generally to video coding and more particularly to video coding in which the image is decomposed into objects prior to coding. Each of the individual objects is then coded separately.

For many image transmission and storage applications, significant data compression may be achieved if the trajectories of moving objects in the images are successfully estimated. Traditionally, block-oriented motion estimation has been widely investigated due to its simplicity and effectiveness. However, block and object boundaries in a scene normally may not coincide because the blocks are not adapted to the image contents. This can lead to visible distortions in low bit rate-coders, known as blurring and mosquito effects.

Object-oriented coding techniques were developed to overcome the disadvantages of block-oriented coding. In one type of object-oriented coding, the image sequence is segmented into moving objects. Large regions with homogeneous motion can be extracted, resulting in higher compression and reduced motion boundary visible distortions. As the foreground objects carry more new information relative to the slowly changing background, the background can be transmitted less frequently than the foreground. Consequently, the foreground objects must be correctly identified to achieve the desired compression levels without adding undue distortion.

As a result, segmentation is an important intermediate step in object-oriented image processing. For this reason, many approaches to segmentation have been attempted, such as motion-based, focus-based, intensity-based, and disparity-based segmentation. The problem with each of these approaches is their feature specificity, which limits the scenes to which they are successfully applied. For example, the scene must contain motion for motion-based segmentation to be applicable. The scene must contain significant contrast to supply intensity-based segmentation. Similar features are required for the other approaches. In addition, the motion-based approach fails for scenes containing both foreground and background motion, such as moving foreground shadows cast onto the background. The focus-based approach also fails when the foreground is blurred. The intensity-based approach fails for textured objects because a single object erroneously segments into multiple objects. And the measurement of disparity in the disparity-based approach is complex and error-prone.

One technique is to use a priori knowledge about the images to select the coding method, which overcomes this problem. However, this makes image coding inconvenient in that processing must include a determination of the type of image and then a selection of the most appropriate coding type for that image. This significantly increases preprocessing costs of the images prior to coding. Alternatively, a lower quality coding must be employed. Unfortunately, neither of these alternatives is acceptable as bandwidth remains limited for image transmission and consumers expect higher quality imagery with increased technology.

The issue then becomes how to accentuate the strengths of these methods and attenuate their failings in foreground and background segmentation. Several possibilities have been examined. One approach combines motion and brightness information into a single segmentation procedure which determines the boundaries of moving objects. Again, this approach will not work well because the moving background will be segmented with the moving foreground and therefore classified and coded as foreground.

Another approach uses a defocusing and a motion detection to segment a foreground portion of the image from a background portion of the image. This process is shown in FIGS. 7–9. FIG. 7 shows the process, FIG. 8 shows the segmentation results over several frames, and FIG. 9 shows the results of the defocus measurement. However, this approach requires a filling step to the process. Filling is a non-trivial problem, especially where the foreground image segment output by this process results in objects without closed boundaries. In this case, significant complexity is added to the overall process. Given the complexity inherent in video coding, the elimination of any complex step is significant in and of itself The present invention is therefore directed to the problem of developing a method and apparatus for segmenting foreground from background in an image sequence prior to coding the image, which method and apparatus requires no a priori knowledge regarding the image to be segmented and yet is relatively simple to implement.

SUMMARY OF THE INVENTION

The present invention solves this problem by integrating multiple segmentation techniques by using a neural network to apply the appropriate weights to the segmentation mapping determined by each of the separate techniques. In this case, the neural network has been trained using images that were segmented by hand. Once trained, the neural network assigns the appropriate weights to the segmentation maps determined by the various techniques.

One embodiment of the method according to the present invention calculates the motion, focus and intensity segmentation maps of the image, and passes each of these maps to a neural network, which calculates the final segmentation map, which is then used to outline the segmented foreground on the original image. In this embodiment, two consecutive images are acquired for use in detecting the various segmentation maps input to the neural network.

According to the present invention, the step of detecting motion includes detecting a difference between pixels in successive frames and determining that a pixel is in motion if the difference for that pixel exceeds a predetermined threshold. The step of detecting focus includes calculating the magnitude of the Sobel edge detection over an nxn pixel square and dividing the magnitude of the Sobel edge detection by the edge width. The step of detecting intensity comprises determining a gray level of the pixel.

Another embodiment of the method of the present invention for processing an image sequence to segment the foreground from the background, includes acquiring successive images in the sequence, simultaneously measuring motion, focus and intensity of pixels within successive images, inputting the motion, focus and intensity measurements to a neural network, calculating foreground and background segments using the motion, focus, and intensity measurements with the neural network, and drawing a segment map based on the calculated foreground and background segments.

In an advantageous implementation of the above methods according to the present invention, it is possible to speed the training of the neural network using an adaptive learning rate. One possible embodiment of the adaptive learning rate is the following equation:

$$\Delta w = lr * dp^T$$

$$\Delta b = lr * d$$

where w is a layer's weights, b is a layer's bias, lr is the adaptive learning rate, d is the layer's delta vectors and p is the layer's input vector, and T indicates that vector p is first transposed before being multiplied.

An apparatus for segmenting the foreground and background from a sequence of images according to the present invention includes a motion detector, a focus detector, an intensity detector and a neural network. The motion detector detects motion of pixels within the image sequence and outputs a motion segmentation map. The focus detector detects pixels that are in focus and outputs a focus segmentation map. The intensity detector detects those pixels that have high intensity and those with low intensity and outputs an intensity segmentation map. The neural network is coupled to the motion detector, the focus detector and the intensity detector, and weighs the outputs from these detectors and outputs a final segmentation map.

One advantageous implementation of the neural network used in the present invention includes a two layer neural network. In this case, the neural network has a hidden layer with two neurons and an output layer with one neuron. In this implementation, the intensity map is input to a first neuron in the hidden layer using a first weight and a second neuron in the hidden layer using a second weight, the focus map is input to the first neuron in the hidden layer using a third weight and the second neuron in the hidden layer using a fourth weight, the motion map is input to the first neuron in the hidden layer using a fifth weight and the second neuron in the hidden layer using a sixth weight. Bias information is input to the first and second neurons using a seventh weight and an eighth weight, respectively.

Yet another advantageous embodiment for implementing the method of the present invention includes a means for digitizing the image sequence to obtain a sequence of digitized images, a means for segmenting an image based on motion of an object within the image, the motion segmenting means being coupled to the means for digitizing and outputting a motion segmentation map, a means for segmenting an image using focus measurements, the focus segmenting means being coupled to the means for digitizing and outputting a focus segmentation map, a means for segmenting an image using brightness measurements, the brightness segmenting means being coupled to the means for digitizing and outputting a brightness segmentation map, and a neural network that calculates a segmentation map using segmentation maps output by the motion segmenting means, the brightness segmenting means and the focus segmenting means.

BRIEF DESCRIPTION OF THE DRAWINGS

FIG. 8 shows the segmentation results of the process of FIG. 7 over several frames.

FIG. 9 shows the results of the defocus measurement used in the process of FIG. 7.

DETAILED DESCRIPTION

The present invention provides an approach for segmenting foreground from background based on integrated cues. This approach integrates three measurements, focus, intensity, and motion, using a two-layered neural network, to segment complex scenes. Its advantage is that it combines simple segmentation measurements to increase robustness for segmenting a variety of scenes.

Figure 1:
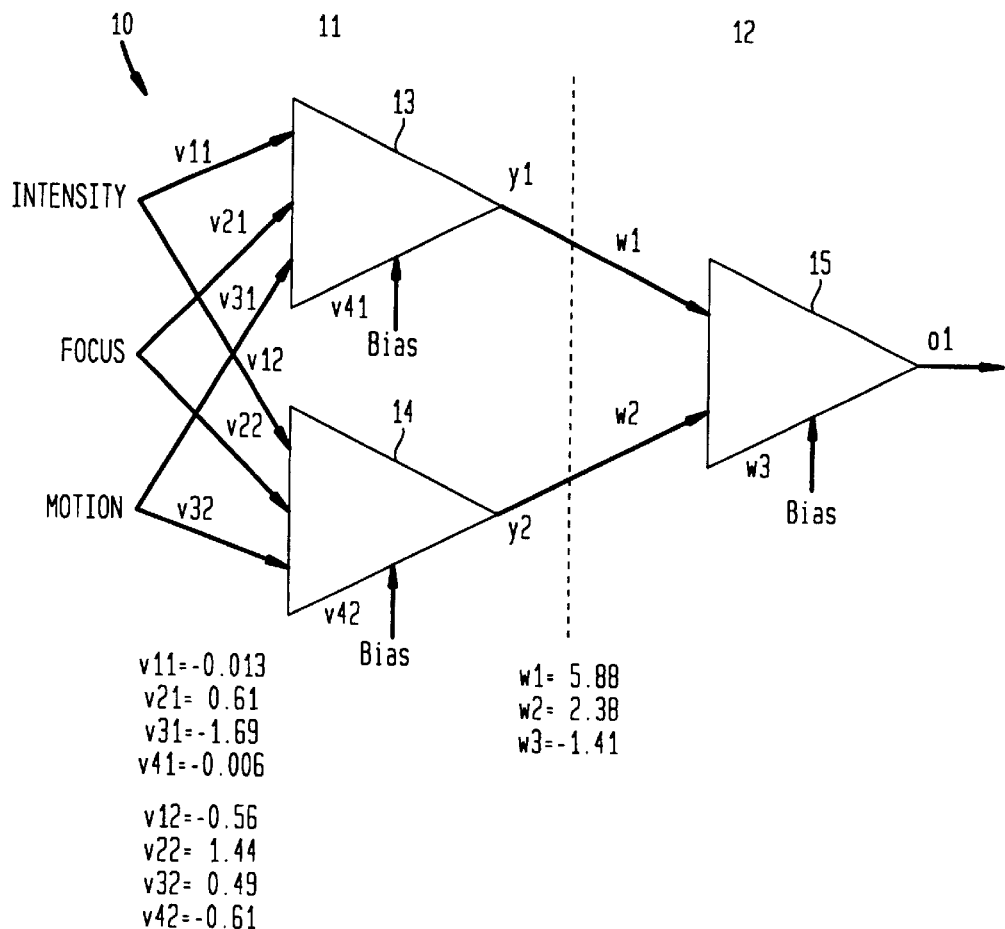
FIG. 1 depicts a two-layer neural network used in the apparatus of the present invention, with one embodiment of weights for the different paths in the network.

By forming three separate segment maps of the image sequence, the present invention then chooses the best map based on the training of a neural network. The neural network used in the present invention is shown in FIG. 1, along with the optimum weights determined from the training of this network using a variety of images.

Each map is an N×M image consisting of N×M pixels. Input to the neural network is corresponding pixels, I(i,j), m(i,j), f(i,j), where i=1, . . . , N and j=1, . . . , M, one at a time in a left-to-right top-to-bottom order. The pixel values for the motion map are either 0 or 255 (where 0 indicates no motion and 255 indicates motion). The pixels values for the focus map and intensity map range from 0 to 255, inclusive.

Now, once each pixel is input to the neural network, the network calculates an output value, o(i,j) for the (i,j) inputs. The final output result is an N×M image where 0=background and 255=foreground.

So, we can think of the processing of one image as a loop that runs N×M times, i.e., the neural network is accessed N×M times. Similarly, for a sequence of images, if one image loops N×M times, then for K images the neural network is accessed K×N×M times.

According to the present invention, a two-layered neural network integrates three measurements for segmentation: focus, intensity, and motion. It is worthy to note that any technique for detecting focus, intensity or motion, respectively, will suffice, as long as it provides a segmentation map based on the same information. The training of the neural network will then determine the appropriate weights to apply to the various inputs using the different segmentation techniques.

Two assumptions are made about the scene. First, it is assumed that the scene foreground is focused and the background blurred, i.e. closer objects are focused. Second it is assumed that objects to be segmented are in motion.

Segmentation Measurements
Focus Detector

The focus detection technique used in the present invention is a known technique, therefore a full detailed description is not necessary to describe the present invention. A brief description, however, will be helpful.

Focus is a function of depth. The farther away an edge is from the point of focus, the more blurred it becomes. This measurement indicates different depths. If an object point E is not in focus, the resulting image is a blurred image e called a blur circle. The blur circle size, hence the amount of focus, is a function of the depth u of point N.

Image focus is easily measured from high frequency components, such as image edges. The less blurred an edge, the higher the image focus, measured from edge strength. The focus measurement d over an n×n neighborhood in an image is $$d = \frac{\sum_x \sum_y |S(x,y)|^2}{w}$$

where $|S(x,y)|^2$ is the magnitude of Sobel edge detection on image g(x,y) and w is the edge width in g(x,y). Then, within the n×n neighborhood, $f(x+i,y+j)=d$, where $f(x,y)$ is the focus measurement image, i=0, . . . , n, and j=0, . . . , n.

The output of this detector is a map showing the pixels in the current image that are in focus and those that are blurred, i.e., the pixels that are part of the foreground and the pixels that are part of the background. This map is then input to the neural network as discussed below.

Motion Detector

As in the focus detection, the motion detection technique used in the present invention is a known technique, thus a detailed description of this technique is not necessary to describe the present invention. A brief description, however, will be helpful.

Motion is detected using a subtraction method, $$md(x,y)=g_{i+1}(x,y)-g_i(x,y)$$

where md(x,y) is the motion detected image and $g_i$ and $g_{i+1}$ are the ith and (i+1)-th frame in the sequence. Motion between successive frames is indicated by pixel differences greater than threshold T. If the pixel difference is greater than the threshold, the pixel in the current image is set to a gray level of 255, otherwise it is set to a gray level of 0. In this case, a gray level of 255 represents black and a gray level of 0 represents white. This threshold is determined experimentally in a known way. If the object has not moved, then the result is a blank image.

$$m(x,y) = \begin{cases} 255 & \text{if } md(x,y) > T, \\ 0 & \text{otherwise} \end{cases}$$

where m(x,y) is the motion segmented image.

The output from this motion detector is a motion map indicating the pixels that are in motion and those that are not, which represent the pixels that are part of the foreground and the pixels that are part of the background, respectively.

Intensity Detector

As in the focus and motion detection, the intensity detection technique used in the present invention is a known technique, thus a detailed description of this technique is not necessary to describe the present invention. A brief description, however, will be helpful.

Intensity J(x,y) is simply gray level from 0 to 255. The importance of foreground intensity data is that it assists the neural network in segmenting object interiors. Focus and motion are measured from object edges. Therefore, a third measurement is needed for object interiors. In our work, this measurement is intensity, where large regions are input to the neural network.

The output of this detector is an intensity map, which indicates those pixels belonging to the foreground and those to the background.

Neural Network A two-layered back propagation network is trained to segment a sequence.

FIG. 1 shows the network architecture. The neural network 10 includes a hidden layer 11 and an output layer 12. The hidden layer 11 contains two neurons 13, 14, and the output layer contains one neuron 15. The neurons 13–15 use sigmoid functions with weighted inputs. Essentially, these are summing amplifiers with weighted inputs. The inputs to the network are the motion, focus, and intensity measurements, or segmentation maps. The output is the segmented foreground image o(x,y), $$o(x,y) = \begin{cases} 255 & \text{if foreground,} \\ 0 & \text{otherwise} \end{cases}$$

The network is trained using the initial two frames of a sequence and its hand-segmented result. It is possible to speed the training with an adaptive learning rate, according to the rule, $$\Delta w = lr * dp^T$$

$$\Delta b = lr * d$$

where w is a layer's weights, b is its bias, lr is the adaptive learning rate, d is the layer's delta vectors, and p is its input vector and T indicates that vector p is first transposed before being multiplied.

METHODOLOGY

Figure 2:
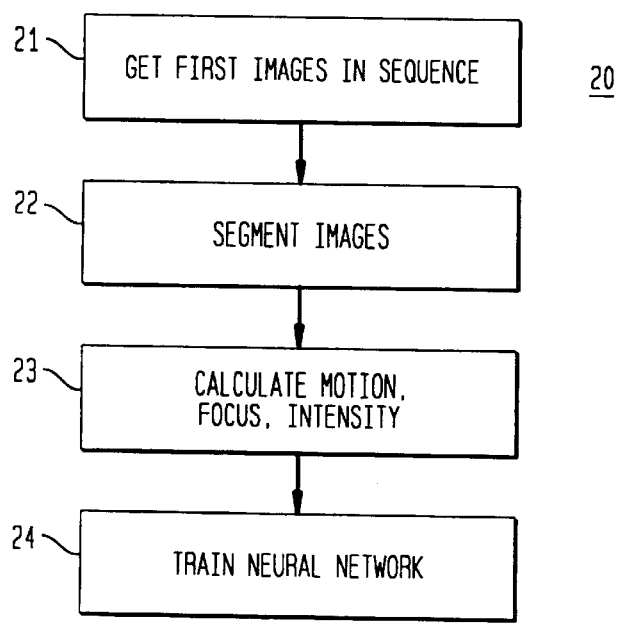
FIG. 2 depicts the neural net training algorithm for foreground/background segmentation.

The present invention provides an integrated segmentation approach to coding of images. Foreground and background features are segmented and background features discarded. The network is first trained using the first two frames of a sequence to get focus, motion, intensity, and segmented data. See FIG. 2, which shows the four step training algorithm 20 for training the neural network.

In the first step of the process, the first images in the sequence are acquired 21. Next, the images are segmented 22 by hand. Next, motion, focus and intensity are calculated 23. Finally, the neural network is trained 24 using the speed up process discussed above.

Figure 3:
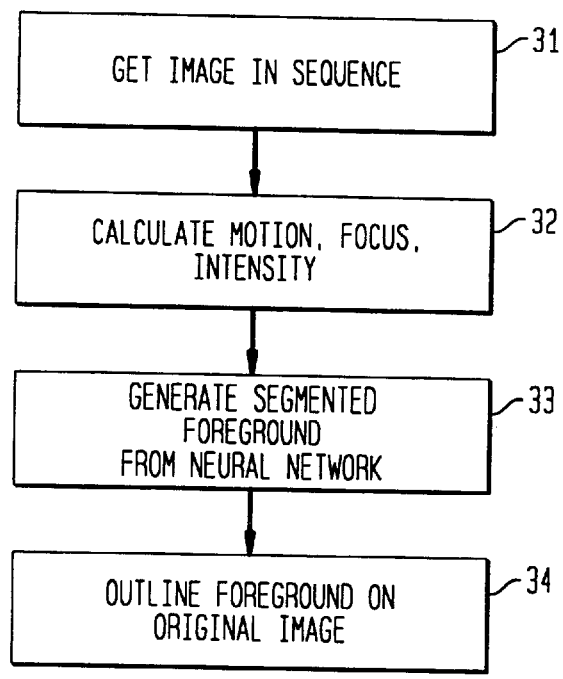
FIG. 3 depicts the foreground/background segmentation algorithm of the present invention.

FIG. 3 also shows the four-step segmentation algorithm 30. First, two successive images are acquired 31. Next, focus, motion, and intensity are measured 32. The measurements are input to the trained neural network 33. The network outputs the segmented foreground. The segmented foreground is then outlined on the original image 34, which indicates the capability of the process of the present invention.

Figure 5A:
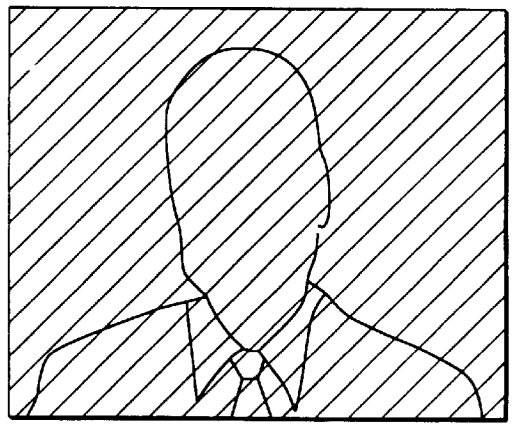
FIGS. 5(a)–(c) depict the segmentation results of the present invention, in which 5(a) is the original frame, 5(b) is the neural network segmented output, and 5(c) is the segmented foreground outlined.
Figure 5B:
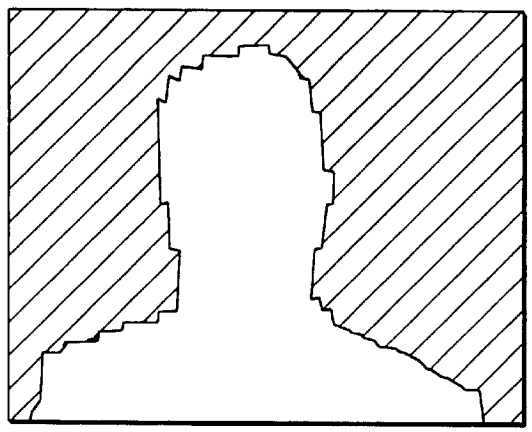
Figure 5C:
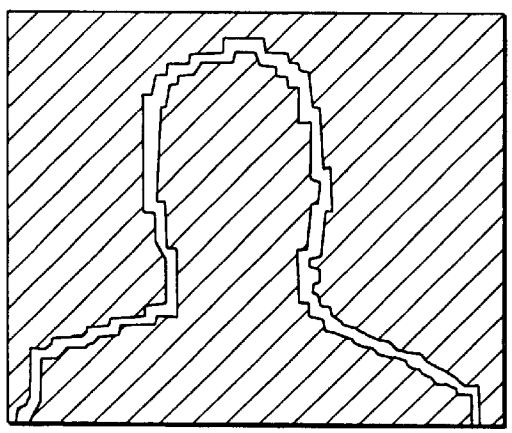

As can be seen in FIG. 5(c), the output of the process resulted in properly segmenting the man from the background. The segmentation map is used as a mask for separating the foreground from the background in the image coding process.

The neural network applies the weights in Table 1 below to calculate the following equation:

$$o(x,y) = \begin{matrix} w_1 \\ w_2 \\ w_3 \end{matrix} \begin{bmatrix} v_{11}I(x,y) + v_{21}f(x,y) + v_{31}m(x,y) + v_{41}b(x,y) \\ v_{12}I(x,y) + v_{22}f(x,y) + v_{32}m(x,y) + v_{42}b(x,y) \\ b(x,y) \end{bmatrix} +\\+$$

where o(x,y) is the segmentation map, I(x,y) is the intensity segmentation map, m(x,y) is the motion segmentation map, f(x,y) is the focus segmentation map, b(x,y) is the bias information, and v11, v21, v31, v41, v12, v22, v32, v42, w1, w2, and w3 are the weights indicated in Table 1. These weights have been determined to work over some particular images. Modifications to the exact weights will occur depending upon the exact images being used. These weights are merely indicative of those determined by the inventors.

TABLE 1

| Weight | Value |
|---|---|
| v11 | −0.013 |
| v21 | 0.61 |
| v31 | −1.69 |
| v41 | −0.006 |
| v12 | 0.56 |
| v22 | 1.44 |
| v32 | 0.49 |
| v42 | −0.61 |
| w1 | 5.88 |
| w2 | 2.38 |
| w3 | −1.41 |

RESULTS

Neural network training

Figure 4:
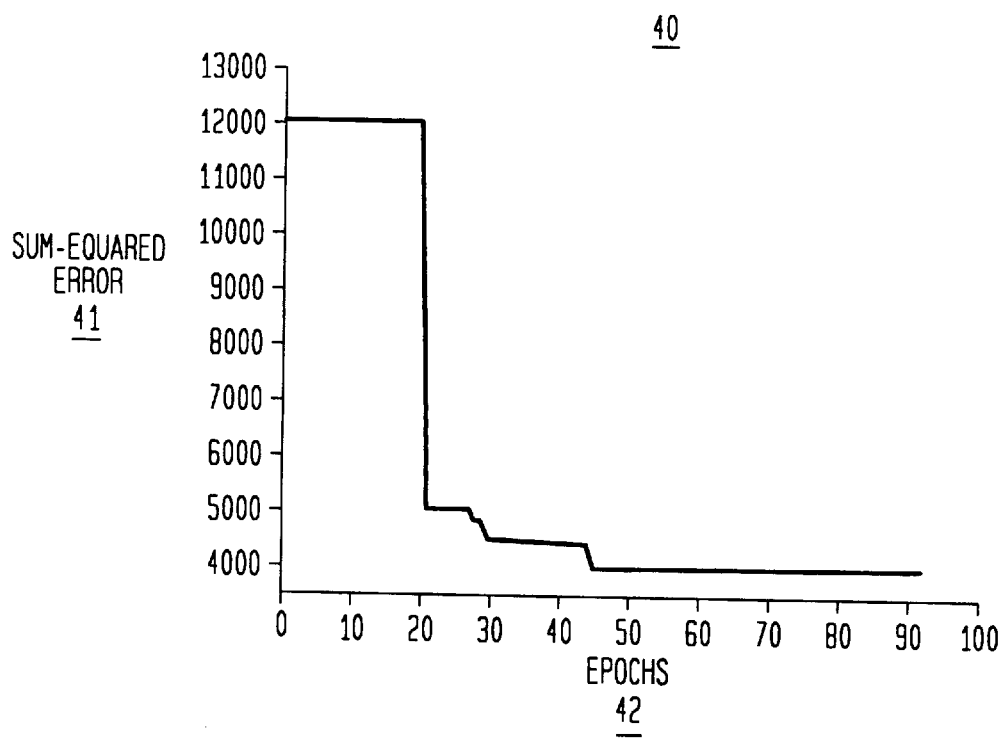
FIG. 4 depicts the training plot of the neural network showing sum-squared error versus epochs.

FIG. 4 shows a plot 40 of the error rate (sum-squared error) 41 versus epochs (i.e., training cycles, which for an N×M image is N×M bytes of processing) 42 during training of a test sequence (see FIG. 5). With good training, error reduces as training time increases, until a minimum error is reached. In our training session, the sum squared error reached a minimum at 4000. This translates into an average intensity difference between the neural network-generated segmentation map and the actual segmentation map for our 176×144 images of 0.0025/pixel.

An advantage of the present invention is that it segments without any post-processing operation to fill the segmented object interior. Prior techniques required a fill operation to create the segmentation mask shown in FIG. 5(b). This filling operation is non-trivial, especially with regard to an image without line segments that are closed. As a result of the present invention, the shape of the object is preserved by the intensity measurement in the neural network. As the focus and motion detectors operate on edge effects, which are high frequency components, they provide little information regarding the interior of the image. Thus, without the intensity measurement, a filling operation is necessary. Since the intensity measurement provides information regarding the interior of the image, using this information in the neural network eliminates the need for filling the interior of the image, thus making the post-processing filling step unnecessary. In addition, the intensity measurements are easily calculated.

Segmentation

FIG. 5 shows the segmentation results for a frame in an image sequence. As shown, the neural network segmentation is accurate for the fiftieth frame of this sequence, which was trained on the first and second frames of the sequence. FIG. 5(a) depicts the output from the camera 61, which is input to the three detectors. FIG. 5(b) shows the final segmentation map output from the neural network, which as is evident corresponds well to the outlined figure. FIG. 5(c) shows the segmentation foreground outlined, which shows the boundary of the foreground and background. This is shown to indicate the success of the segmentation approach, but is never actually created for the next step in the coding process.

Figure 6:
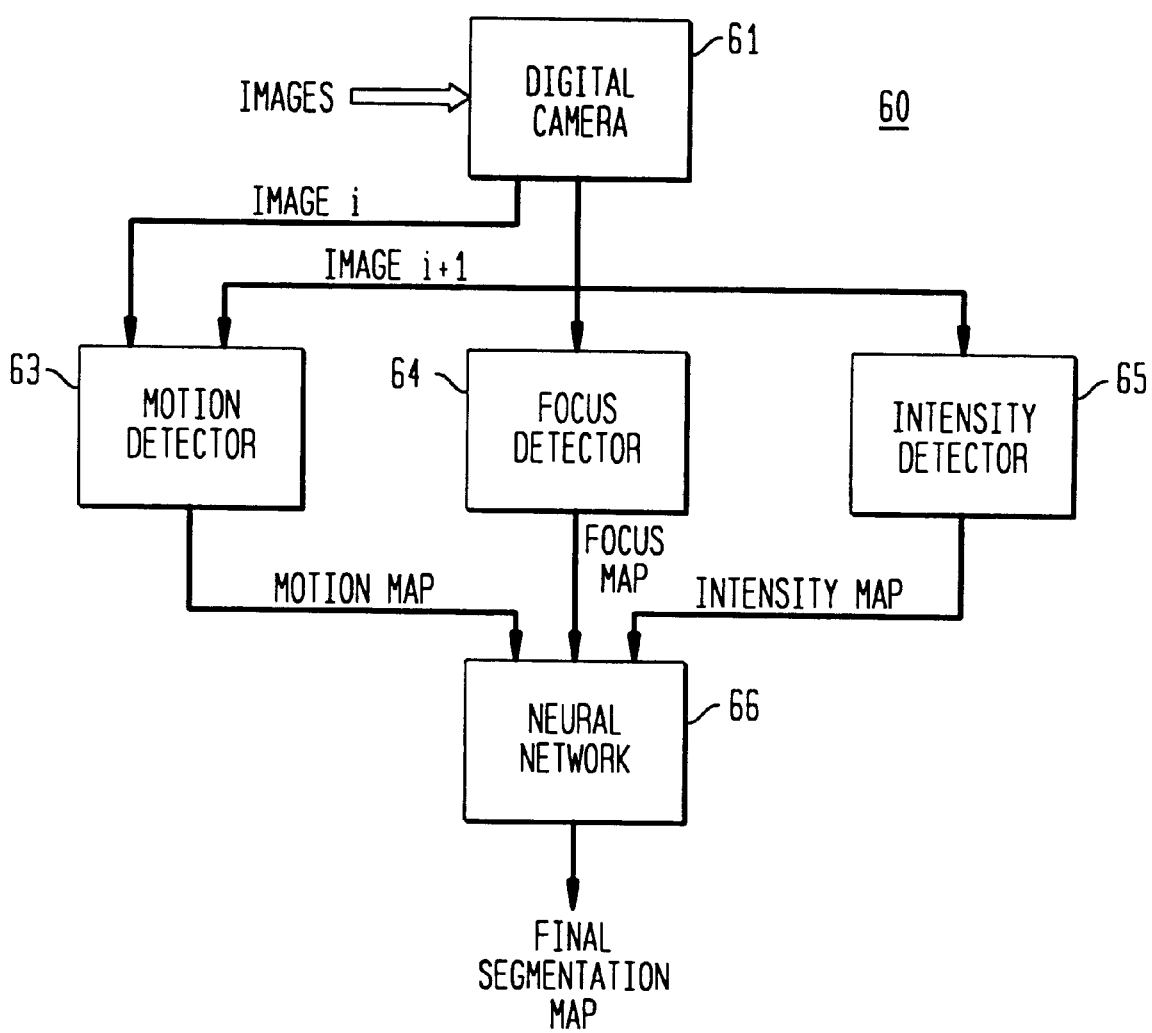
FIG. 6 depicts one possible embodiment of the apparatus for employing the method of the present invention
Figure 7:
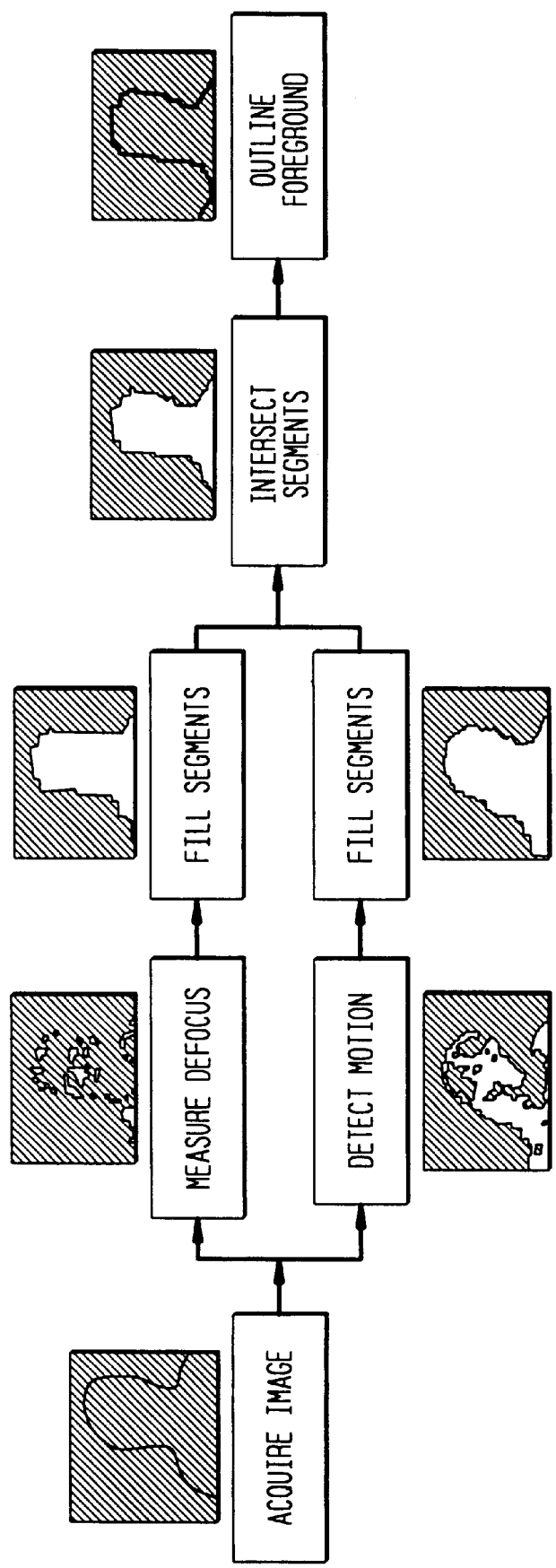
FIG. 7 shows a prior art process using a fill segmenting procedure.

FIG. 6 shows the apparatus 60 for implementing the method of the present invention. Two successive images are first acquired using a digital camera 61, for example. Next, the digitized images are input to three detectors 63, 64, 65, which calculate motion segmentation maps, focus segmentation maps and intensity segmentation maps, respectively. These maps are then input to the neural network 66, which outputs the final segmentation map, which is used to outline the foreground from the background.

Thus, the present invention discloses an approach to foreground and background segmentation using integrated measurements. This approach is advantageous for two reasons. One, it is computationally simple. Two, combined measurements increase robustness in segmenting complex scenes. Other possible modifications include comparing the use of intensity versus color measurements as a basis for segmentation.

While a neural network is used to perform the integration of the multiple maps and the assignment of weight, a fizzy logic circuit could also be employed. This invention could also be implemented on a Sun Sparc workstation with an image acquisition device, such as a digital camera and a video board.

One could also modify the method of the application and use a known disparity detector as an additional input to the neural network or as a replacement for one of the focus or intensity measurements. This is accomplished by simply by replacing one of the focus or intensity detectors with the disparity detector, which outputs its version of the segmentation map, which is then weighted by the neural network.

What is claimed is:

1. A method for segmenting an image comprising:
    a) applying at least three segmentation techniques to an image producing independent segmentation maps, the segmentation techniques including focus, motion, and intensity measurements, the focus and motion measurements producing edge information on foreground portions of the image, and the intensity measurement producing interior information on the foreground portions of the image;
    b) providing a neural network with the segmentations maps produced from the segmentation techniques, wherein each map is processed independently from and without combination with another map, and each map is provided as a separately weighted, dedicated, and independent input to the neural network; and
    c) wherein the neural network integrates the dedicated, independent and separately weighted segmentation maps as a final segmentation map output without post-processing filling, the output including segmented, filled foreground portions of the image.

2. A method for segmenting a sequence of images prior to coding the image sequence comprising the steps of:
    a) detecting motion within foreground and background portions of the image sequence;
    b) detecting focus within the image sequence;
    c) detecting intensity within the image sequence, the motion and focus detection producing measurements including edge information on foreground portions of the image sequence, and the intensity detection producing a measurement including interior information on foreground portions of the image sequence;

d) calculating segments using a neural network employing detected measurements from steps a) through c) wherein each measurement is processed independently from and without combination with another measurement, and each measurement is provided as a separately weighted, dedicated, and independent input to the neural network, the neural network integrating the dedicated, independent and separately weighted measurements as a final segmented output image without post-processing filling, the output image including segmented, filled foreground portions of the image.

3. The method according to claim 2, further comprising the steps of:

e) acquiring two consecutive images for use in the detecting steps.

4. The method according to claim 2, wherein the step of detecting motion comprises:

(i) detecting a difference between pixels in successive frames; and (ii) determining that a pixel is in motion if the difference for that pixel exceeds a predetermined threshold.

5. The method according to claim 2, wherein the step of detecting focus comprises:

(i) calculating the magnitude of the Sobel edge detection over an nxn pixel square; and (ii) dividing the magnitude of the Sobel edge detection by the edge width.

6. The method according to claim 2, wherein the step of detecting intensity comprises determining a gray level of the pixel.

7. A method for processing an image sequence to segment foreground from background, comprising the steps of:

a) acquiring successive images in the sequence;

b) simultaneously measuring motion, focus and intensity of pixels within successive images, wherein step of simultaneously measuring motion includes measuring motion within foreground and background portions of the images, the focus and motion measurements producing edge information on foreground portions of the image sequence, and the intensity measurement producing interior information on the foreground portions of the image sequence;

c) inputting the motion, focus and intensity measurements to a neural network wherein each measurement is processed independently from and without combination with another measurement, and each measurement is provided as a separately weighted, dedicated, and independent input to the neural network, d) calculating foreground and background segmentation using the motion, focus, and intensity measurements with the neural network; and e) drawing a segment map based on the calculated foreground and background segments without post-processing filling, the segment map including segmented, filled foreground portions of the image sequence.

8. The method according to claim 7, further comprising the steps of:

f) training the neural network using two initial frames and a hand-segmented result.

9. The method according to claim 8, further comprising the step of:

g) speeding up the training step f) using an adaptive learning rate.

10. The method according to claim 7, wherein the step of detecting motion comprises:

(i) detecting a difference between pixels in successive images; and (ii) determining that a pixel is in motion if the difference for that pixel exceeds a predetermined threshold.

11. The method according to claim 7, wherein the step of detecting focus comprises:

(i) calculating the magnitude of the Sobel edge detection over an nxn pixel square; and (ii) dividing the magnitude of the Sobel edge detection by the edge width.

12. The method according to claim 7, wherein the step of detecting intensity comprises determining a gray level of the pixel.

13. An apparatus for segmenting foreground and background from a sequence of images;

a) a motion detection detecting motion of pixels within foreground and background portions of the image sequence and outputting a motion map;

b) a focus detector detecting pixels that are in focus and outputting a focus map;

c) an intensity detector detecting those pixels that have high intensity and those with low intensity and outputting an intensity map, the focus and motion detection producing measurements including edge information on foreground portions of the image sequence, and the intensity detection producing a measurement including interior information on the foreground portions of the image sequence;

d) a neural network being coupled to the motion detector, the focus detector and the intensity detector, weighing and integrating the outputs from these detectors and outputting a segmentation map without post-processing filling, the output segmentation map including segmented, filled foreground portions of the image sequence, and e) wherein each output of the detectors is processed independently from and without combination with another output, and each output is provided as a separately weighted, dedicated, and independent input to the neural network.

14. The apparatus according to claim 13, wherein the neural network comprises a two layer neural network.

15. The apparatus according to claim 13, wherein the neural network further comprises a hidden layer with two neurons and an output layer with one neuron, and each of the neurons employ sigmoid functions.

16. The apparatus according to claim 15, wherein the two neurons in the hidden layer are coupled to the one neuron in the output layer using a ninth weight and a tenth weight, respectively.

17. The apparatus according to claim 16, wherein the one neuron in the output layer includes three inputs, one from each of the two neurons in the hidden layer and a bias input, having an eleventh weight.

18. A device for segmenting objects within a sequence of images prior to coding of the images for transmission or storage of the images comprising:

a) means for digitizing the image sequence to obtain a sequence of digitized images;

b) means for segmenting an image based on motion of an object in foreground and background portions within the image, said motion segmenting means being coupled to said means for digitizing and outputting a motion segmentation map;

c) means for segmenting an image using focus measurements, said focus segmenting means being coupled to said means for digitizing and outputting a focus segmentation map;

d) means for segmenting an image using brightness measurements, said brightness segmenting means being coupled to said means for digitizing and outputting a brightness segmentation map, the motion producing a measurement including edge information on foreground portions of the image, the focus measurements including edge information on the foreground portions of the image, and the brightness measurements including interior information on the foreground portions of the image;

e) a neural network for calculating a final segmentation map using segmentation maps output by the motion segmenting means, the brightness segmenting means and the focus segmenting means, and applying the outputted maps to the neural network, wherein each map is processed independently from and without combination with another map, and each map is provided as a separately weighted, dedicated, and independent input to the neural network, the neural network integrating the dedicated, independent and separately weighted maps as the final segmentation map without post-processing filling, and the final segmentation map including segmented, filled foreground portions of the image.

* * * * *